US008769010B2

(12) United States Patent
Green

(10) Patent No.: US 8,769,010 B2
(45) Date of Patent: Jul. 1, 2014

(54) NETWORKING SYSTEM AND METHOD OF GAMING WITH A USER OF A SOCIAL NETWORK

(75) Inventor: Mark Denzil Green, London (GB)

(73) Assignee: Sony Computer Entertainment Europe Limited (GB)

( * ) Notice: Subject to any disclaimer, the term of this patent is extended or adjusted under 35 U.S.C. 154(b) by 361 days.

(21) Appl. No.: 13/074,545

(22) Filed: Mar. 29, 2011

(65) Prior Publication Data
US 2011/0246576 A1 Oct. 6, 2011

(30) Foreign Application Priority Data

Mar. 31, 2010 (EP) ..................................... 10158744

(51) Int. Cl.
G06F 15/16 (2006.01)
G06Q 10/10 (2012.01)
H04L 29/06 (2006.01)
H04L 29/08 (2006.01)

(52) U.S. Cl.
CPC ............... G06Q 10/10 (2013.01); H04L 29/06 (2013.01); H04L 29/08072 (2013.01)
USPC ........................................................ 709/204

(58) Field of Classification Search
None
See application file for complete search history.

(56) References Cited

U.S. PATENT DOCUMENTS 6,338,086 B1 * 1/2002 Curtis et al. .................. 709/218
7,610,287 B1 * 10/2009 Dean et al. ............................ 1/1
7,627,828 B1 * 12/2009 Collison et al. ............... 715/752
7,695,370 B2 * 4/2010 Liu et al. ......................... 463/42
2002/0086732 A1 7/2002 Kirmse et al.
2005/0223219 A1 * 10/2005 Gatto et al. .................... 713/156
2006/0196686 A1 * 9/2006 Gatto et al. .................... 173/191
2006/0258460 A1 11/2006 Crawford et al.
2008/0016176 A1 1/2008 Leitner
2010/0010994 A1 * 1/2010 Wittig et al. ....................... 707/6

FOREIGN PATENT DOCUMENTS

EP       2020802 A2    2/2009
WO  2008104783 A1    9/2008

OTHER PUBLICATIONS

European Search Report EP 10158744, dated Mar. 3, 2011.

* cited by examiner

Primary Examiner — Ian N Moore
Assistant Examiner — Latresa McCallum
(74) Attorney, Agent, or Firm — Lerner, David, Littenberg, Krumholz & Mentlik, LLP

(57) ABSTRACT

A networking system comprises a data communication network, an entertainment device operable to communicate over the network and to run a first application, a social networking server operable to supply a second application to a social networking client over the network, the client being operable to run the second application once received from the server. In response to a first predetermined event during operation of the first application, the entertainment device can communicate an alert message to the server identifying a user of the client to receive the second application. The social networking server is arranged to supply the second application to the client in response to the alert message. In response to a second predetermined event during operation of the second application, the client is arranged to communicate an acknowledgement message to the entertainment device. In response, the entertainment device is arranged to modify operation of the first application.

13 Claims, 5 Drawing Sheets

US 8,769,010 B2

NETWORKING SYSTEM AND METHOD OF GAMING WITH A USER OF A SOCIAL NETWORK

CROSS REFERENCE TO RELATED APPLICATIONS

The present application claims the benefit of and priority to EP Application No. 10158744.2, filed Mar. 31, 2010, the entire disclosure of which is incorporated by reference herein.

BACKGROUND OF THE INVENTION

1. Field of the Invention

The present invention relates to a networking system and method.

2. Description of the Prior Art

A recent phenomenon is the emergence of so-called 'social networks'. Referring to FIG. 1 of the accompanying drawings, social networks such as Facebook® and Myspace® typically have a client-server architecture, in which individual social networking clients 110, 112, 116, 118 are web browsers running on internet-enabled devices, with the web browser operating as the platform for the client-side software of the social network (for example, using a mixture of hypertext markup language or 'HTML', and Javascript or Java® within the web browser). Meanwhile, a social networking server 120 manages the transmission and reception of data to and from the social networking clients. Typically the data communicated between client and server includes updates about the status of the user of a particular social networking client, or queries about the status of users of other, remote social networking clients.

The internet-enabled devices used with social networks are typically personal computers (PCs), but equally they may be smart phones or other internet enabled devices for which the social network provider has made available client-side software for the particular web browser available on that device.

Notably, a user can connect to a social network at different times using different internet-enabled devices, but the user's social networking client can be considered to be the same in each case as it is provided to the current device from the social networking server in response to the user's identity rather than or in addition to the current device's, and operates in a substantially similar manner in each device's respective web browser.

Social networks offer a range of services for keeping in touch with friends, including social games that enable co-operative play, such as poker. Other social games available comprise a simulation of an activity (for example running a fictional Mafia gang, or simply running a farm), in which a user can invite friends within the social network to take part (for example by competing on a neighbouring farm, or adopting a role within the Mafia gang).

However, due to the limitation of the platform (a web browser) and the possible limitations on computing power of the internet-enabled devices upon which the browsers are run, such games tend to be relatively simple both in terms of graphics and content, and may be referred to collectively as 'casual games'.

By contrast, high-performance games that require large processor and graphics resources tend to run independently of a web-browser, in order to have greater access to processor and graphics resources available on a host device; moreover, they are frequently developed for entertainment devices such as gaming consoles and high-specification PCs which can provide superior processing and graphical abilities. Consequently such games cannot be played using a social networking web browser platform.

This isolates users of such high-performance games from the users of casual games within social networks.

In response, publishers of high-performance games sometimes also publish a much simpler version of their game that can be played within a web browser, but this is generally unsatisfactory as such simple versions often do not appeal to the users of the high-performance original or may not be able to capture an important quality of the game, such as its ambience.

Consequently there is still a need to provide players of high performance games with the opportunity to play appealing games with friends who are on a social network.

The present invention seeks to address, alleviate or mitigate this problem.

SUMMARY OF THE INVENTION

In a first aspect, a networking system, comprises a data communication network, an entertainment device operable to communicate over the data communication network and operable to run a first application, a social networking server operable to communicate over the data communication network and operable to supply a second application to a social networking client over the data communication network, and a social networking client operable to communicate over the data communication network and operable to run the second application once received from the social networking server, and in which in response to a first predetermined event during operation of the first application, the entertainment device is arranged to communicate an alert message to the social networking server over the network, the alert message identifying a user of the social networking client to receive the second application, the social networking server is arranged to supply the second application to the social networking client of the identified user in response to the alert message from the entertainment device, in response to a second predetermined event during operation of the second application, the social networking client is arranged to communicate an acknowledgement message to the entertainment device, and in response to receipt of the acknowledgement message, the entertainment device is arranged to modify the operation of the first application.

In another aspect, a method of networking comprises the steps of operating a first application on an entertainment device, detecting a first predetermined event during operation of the first application, communicating an alert message over a network in response to the detected first predetermined event of the first application, the alert message identifying a user of a social network, receiving the alert message at a social networking server, in response to the received alert message, supplying a second application to a social networking client of the identified user, operating the second application on the social networking client, detecting a second predetermined event during operation of the second application, communicating an acknowledgement message over the network to the entertainment device in response to the detected second predetermined event of the second application, receiving the acknowledgement message at the entertainment device, and modifying the operation of the first application responsive to the acknowledgement message.

It will be understood that the first predetermined event of the first application is so named for reasons of clarity, and need not be the actual first of such predetermined events of the first application. In other words, the detection of such an event and the ensuing communication of alert messages etc., may have occurred previously during the operation of the first application, but for the purposes of the claimed system and method it is the first predetermined event referred to. Similarly it will be understood that the second predetermined event of the second application is also named for clarity, and may in fact the actual first such predetermined event to occur in the second application, but for the purposes of the claimed system and method it is the second predetermined event referred to.

The above aspects advantageously allow a user of a high-performance game to interact with one or more users of a social network, engaging them in a casual game application on the social networking client platform which can then have a tangible impact on the operation of the high-performance game. In this way all parties can contribute to the high-performance game outcome using their respective preferred modes of play.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A networking system and method are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 1:
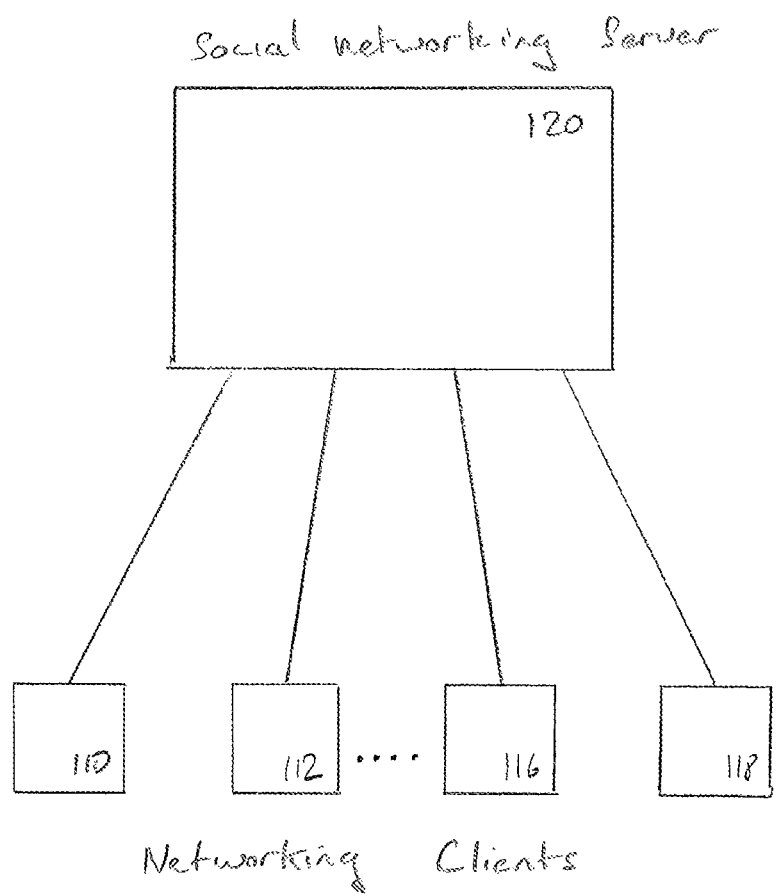
FIG. 1 is a schematic diagram of a social network.
Figure 2:
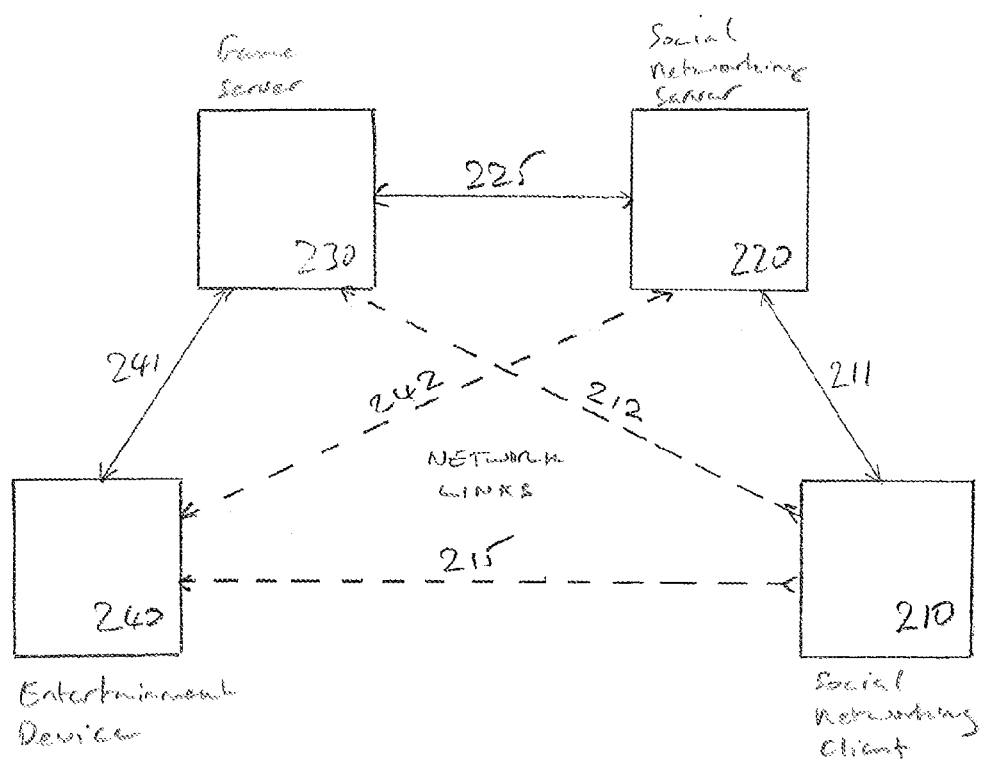
FIG. 2 is a schematic diagram of a networking system in accordance with an embodiment of the present invention.

Referring now to FIG. 2, a networking system in accordance with an embodiment of the present invention comprises a social networking server 220, at least one social networking client 210, optionally a game server 230, and an entertainment device 240. The social networking server and social networking client are similar to those described with respect to the prior art, except as described herein below. In addition, a data communication network comprises some or all of a plurality of network links 211, 212, 215, 225, 241, 242 that are described in detail later, and which are schematic links provided in practice by a physical network (such as the internet) outside the scope of the present invention.

The game server 230 may be a server dedicated to support and administration of a particular high-performance game (for example, co-ordinating on-line instances of a game, and/or providing a central patching mechanism). Alternatively or in addition the game server may provide on-line facilities associated with one or more published games, or with the particular entertainment device (example facilities known in the art include the PlayStation Network® for Sony® PlayStation 3® consoles, and Steam® for PCs).

As noted previously, the entertainment device may be a gaming console such as a PlayStation 3® console, or any other device capable of hosting a high performance game, such as a high specification PC.

With reference now also to FIG. 3A, the operation of an embodiment of the networking system is described.

FIG. 3A illustrates a sequence of operations distributed between the entertainment device 240, the game server 230, the social networking server 220 and the social networking client 210, respectively represented by four vertical lines from left to right across the figure, with time progressing downwards on each line.

Initially, an operation 302 comprises the entertainment device running a first application (i.e. the high performance game) in a conventional manner.

Hereafter, the high performance game is simply referred to as the game except where necessary for the purposes of clarity.

The game is adapted to detect a predetermined event 304 (optionally one of a plurality of such events) during game play. Non-limiting examples of such predetermined events include the finding of a particular in-game object, reaching a certain position in the game, or the health level of the player's in-game character. For the purposes of the operations described in FIG. 3, the predetermined event 304 can be referred to as the first predetermined event in the current operation sequence, even if there have previously been one or more such events and ensuing operations.

In response to the first predetermined event, in an operation 306 the entertainment device communicates an alert message to the game server over the network link 241. The entertainment device may initiate this communication under the instruction of the game itself (i.e. the operation is part of the adapted operation of the game), or the operation may be a feature of the operating system of the entertainment device.

In an embodiment of the present invention, the alert message identifies the game and (if there is more than one possible predetermined event, as noted previously) identifies the event. In addition, the alert message identifies the entertainment device and the user of the device. Furthermore, the alert message identifies a user of a particular social network. As noted above, the user of a particular social network will use a social networking client to access that social network.

Identification of the game may be implicit; for example where the game server is dedicated to a particular game, then the game identity is inferred from the fact that the entertainment device contacts the particular game server.

The identification of the entertainment device may use one or more indicators of origin, such as a (static) IP address, a hardware serial number, an operating system serial number, or any other registration number associated with the entertainment device or operating system (for example an identifier used when downloading operating system upgrades from the game server). Thus for example subsequently a static IP address may be used for direct indication of origin, whilst a serial or registration number may be used by the game server to look up the originating entertainment device.

The identification of the user of the entertainment device may require the user to enter their name using a dialog box, or may use an existing profile name associated with the device.

Where a device can support multiple user profiles then the currently used profile is selected. Alternatively or in addition, a user may store a further name (for example, a different name by which they are known on a particular social network) for inclusion in the alert message again either via a dialog box, or prior to playing the game at the operation 302 (or as part of a registration or configuration process of the game itself).

Similarly, the identification of a user of a particular social network may require the user of the entertainment device to enter the name using a dialog box, and/or such a name may be stored for this purpose prior to playing the game at the operation 302 or as part of configuring the game.

In an operation 308, the game server forwards the alert message to the social networking server using the network link 225. Optionally the game server also includes, appends or prepends a game server identifier in the alert message, such as a static IP address for the game server.

The IP address, URL or equivalent location indicator for the social networking server is supplied to the game server in advance. Optionally it may be updated periodically. Where a game server supports a larger or only partially overlapping geographical region to that of a social networking server, then addresses for a plurality of social networking servers may be made available, and the game server selects the appropriate address for the registered location of the entertainment device.

Alternatively, the or each IP address is included in the game and a chosen IP address for a social networking server is thus available to the entertainment device.

In this latter case, optionally the entertainment device may communicate to the social network server directly using a network link 242, rather than via the game server, so bypassing the operation 308.

In an operation 310, the social networking server attempts to verify the identity of the user of the particular social network included in the alert message. If the user is no longer a member of the social network that the social networking server supports, then optionally an error message may be passed back to the entertainment device either directly or via the game server. Routing messages back to the entertainment device is described in more detail later.

Optionally, verifying the identity of the user of the particular social network with the social networking server may be conducted in a similar manner to that described above when the social network user's name is originally input on the entertainment device, particularly if this was stored prior to the user of the entertainment device playing the game. In this case, a verification request message is sent (not shown) at the time that name was originally input, in a similar manner to that described above for the alert message. Optionally therefore when the alert message is later received, the operation 310 simply checks that the verified user is still a member of the social network.

In any event, if the user of the social network identified in the alert message is verified as a current member of the social network by the social networking server, then in an operation 312 the social networking server schedules the download of an application to the user's social networking client using the network link 211 for the next time the user logs onto the social network. This downloaded application can be referred to as the second application in the sequence of operations of FIG. 3 (the first application being on the entertainment device, as noted previously). The download also includes a means to associate the specific instance of the downloaded second application to the entertainment device. This may be all or relevant parts of the alert message from the entertainment device (such as the origin data and optionally additional information included from the game server). Alternatively it may be a code generated by the social networking server (such as a nonce, being a single-use identification number) and associated with the alert message, with the alert message being stored by the social networking server.

When the identified user of the social network logs next on, optionally they are asked to confirm that the second application can be downloaded. In this case then optionally the identity of the user of the entertainment device may be displayed (such as their user ID or the further name they supplied for this eventuality as described previously), so that the user of the social network can more easily determine who nominated them to receive the second application.

The downloaded second application supplied by the social networking server provides a means by which a casual gamer (such as the user of the social network) can interact with the user of the high performance game on the entertainment device, as described below.

The downloaded second application comprises certain specific operations described later, but otherwise can take any one of a plurality of forms, typically dependent on both the nature of the particular social network and the nature of the event in the high performance game that initiated the downloading of the application to the user of the social network.

For example, if the predetermined event in the game was finding some treasure, then the downloaded second application may be a casual gambling game, in which the user of the social network can use that treasure to win (or lose) more treasure for the user of the high performance game. The mechanism by which the outcome of the casual game is communicated to the entertainment device is described later.

In another example, if the predetermined event in the game was entering a new area of a virtual world, then the downloaded second application may be a casual puzzle game, in which the user of the social network must assemble pieces of a picture to form a map with which the user of the high performance game can then navigate through the new area.

In a further example, if the predetermined event in the game was the user's in-game character running below a threshold level of health, food, or some other commodity relevant to the game, then the downloaded second application may be an ongoing task to provide health, food, etc, using a similar casual game mechanic to that found in virtual pet games such as NintenDogs®, Tamagotchi®, The Sims® and the like, but for the game character of a real game user.

In a yet further example, the predetermined event in the game may be initial player registration for a soccer game, and the downloaded second application may act as football manager, controlling transfers of players, match fixtures and the like, and so determining the squad and/or opponents with which the game plays a soccer match.

Thus more generally, the second application downloaded onto the social network client platform of the identified user is an application (typically an entertainment application such as a casual game), the use of which subsequently modifies some aspect of operation of the high performance game on the entertainment device.

It will be appreciated that different events in the high performance game may therefore have different corresponding applications for download on the social network client platform. Consequently it will also be appreciated that the original alert message may optionally also identify the required application for download.

Irrespective of the nature of the downloaded second application, the second application is adapted to detect a second predetermined event 314 (optionally one of a plurality of such events) during use. Again it will be understood that this predetermined event may be occurring for the first time in the application, but is referred to as the second predetermined event for the purposes of the sequence of operations described in FIG. 3. The second predetermined event will typically be part of a casual game of the second application, such as completion of a particular task, but may equally be some other event, such as achieving a certain number of friends on the social network, or redeeming some form of real or virtual currency.

In response to the detected second predetermined event 314, in an operation 316 the application (or the social networking client in response to an instruction from the second application) communicates an acknowledgement message to the entertainment device.

Depending on the means by which the particular entertainment device was associated with the downloaded program, different means by which to communicate to the entertainment device are possible. For clarity, only one of such means is shown in FIG. 3, as described below.

Figure 3:
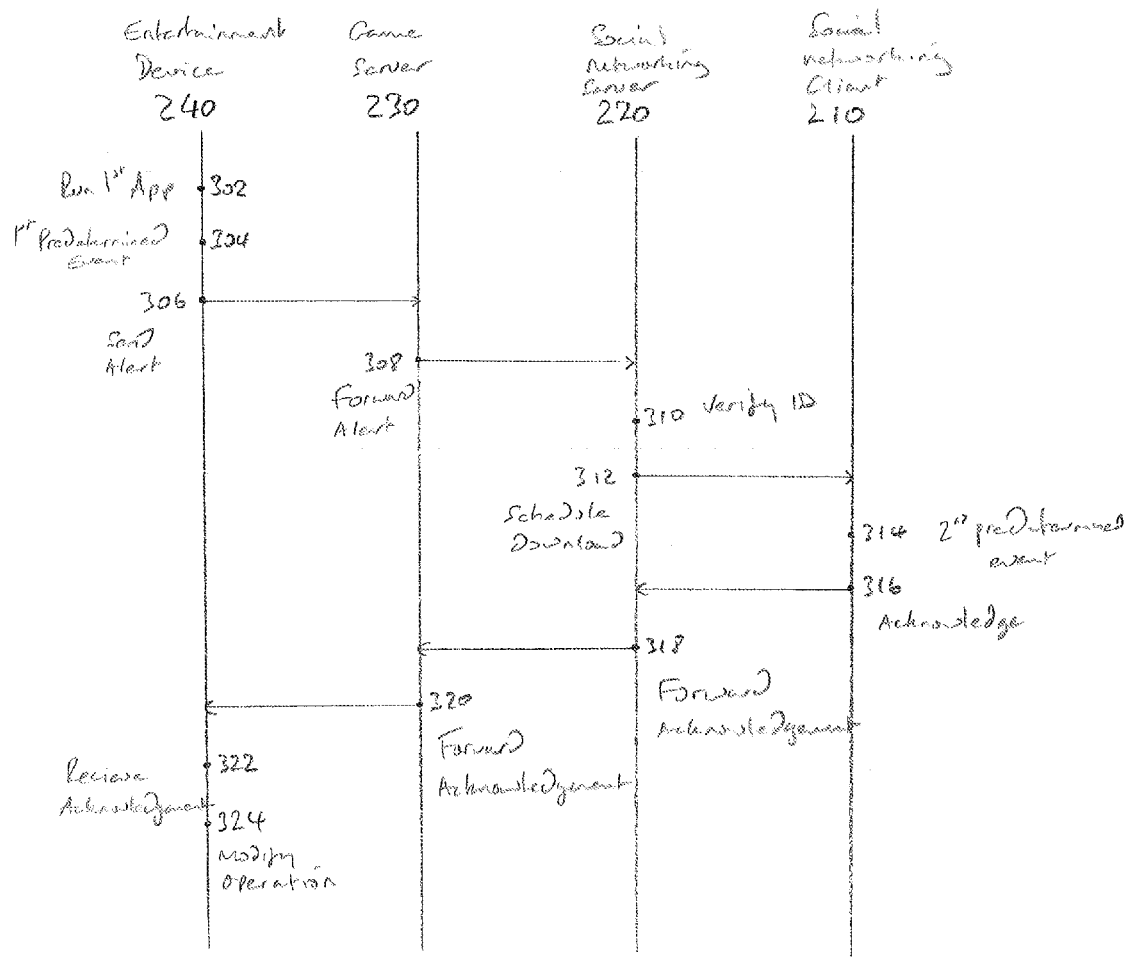
FIG. 3 is a schematic diagram illustrating an operation sequence in accordance with an embodiment of the present invention.

Thus for example, as shown in FIG. 3, where a generated code or nonce was sent to the social networking client, then in the operation 316 the second application appends that code to an acknowledgement message sent to the social networking server over the network link 211, and the social networking server uses the code to look up contact details from the original communication, such as an IP address. Similarly where the social networking client had the necessary contact details itself, it may nevertheless send the acknowledgement message via the social networking server so that the server has a record of the activity.

Alternatively, the second application may communicate directly with either the game server over the network link 212, or with the entertainment device over the network link 215, depending on the information available in the original alert message received by the social networking client and any agreed procedures for such communications (for example whether either the social networking server and/or game server require a record of the acknowledgement for any reason, or if bypassing either server would affect proper operation of either application).

Assuming that the acknowledgement message from the second application was received by the social networking server in the operation 316, then in an operation 318 the social networking server forwards the acknowledgement message on to the game server over the network link 225 as seen in FIG. 3. Alternatively, it could forward it directly to the entertainment device over the network link 242, again depending on the information available and any agreed procedures for such communications.

Assuming that the acknowledgement message from the second application was received by the games server either in the operation 318 or the operation 316, then in an operation 320 the game server forwards the acknowledgement message to the entertainment device over the network link 241.

In an operation 322, the entertainment device receives the acknowledgement message originating from the downloaded application on the social networking client by one of the above described possible routes as implemented in practice.

In an embodiment of the present invention, the acknowledgement message identifies the user of the social network, the game and the event in the game (the first predetermined event) corresponding to the original alert, and the outcome from the second application downloaded onto the social networking client platform. Optionally it may also include contact details such as a static IP address for a particular client device or a messaging address for the user's social network account.

Identification of the first predetermined event in the original game may be implicit where there is only one triggering event.

The identity of the user of the social network may, for example, be the identity originally supplied in the alert message to facilitate easy matching of incoming acknowledgement messages.

The above identification of game, event and social network user may alternatively or in addition be provided implicitly for example by use of a nonce additionally included with the original alert message and returned with the acknowledgement message.

The contact details may be provided to allow further acknowledgments, or to establish a messaging service between the user of the game and the user of social network, optionally within the game for the user of the entertainment device.

The outcome from the second application may explicitly identify the application event (the second predetermined event) if there is more than one event possible, and the nature of the outcome if it is more than a simple indicator that the event occurred; or instead, it may just identify the outcome where this is unique to a respective event.

Thus the outcome may be wholly implicit from the reception of the acknowledgment message where the application simply required completion of one act, whereas by contrast where an application has multiple events and outcomes the outcome may comprise an identifier of a particular outcome such as 'outcome 15', or 'event 3, outcome 5', and/or optionally outcome data such as the amount of treasure won or lost in the gambling example given previously.

Finally, in an operation 324, the game on the entertainment device modifies its operation in response to the outcome conveyed by the acknowledgment message. Using the examples above, the modifications may include incrementing or decrementing the user's character's treasure in the game, providing a map to an area (and/or access to previously undisclosed places within that area), modifying the user's character's health or some other resource, or defining the composition of one or two teams for a soccer match. Other modifications to the operation of a game, for example in terms of player character, non-player character or environmental modifications, may be readily considered by the developer of such a game. Similarly modifications to the underlying game engine, such as access to multiplayer facilities or enhanced graphics may be modified (e.g. enabled) in this manner.

In this way, the user of the high specification entertainment device such as the games console or high specification PC can play their high performance game whilst involving one or more friends who do not play the game but who have a social network account. Conversely the user of a social network can volunteer to engage with a gaming user by co-operating with their play in this manner. A typical example may be of a player of high-performance games who wishes to involve his normally non-gaming girlfriend.

Consequently and more generally, the first application or game is different to the second application or game, being a high-performance application not readily implemented on the social network client platform, and the first and second applications run on respective first and second platforms. This arrangement uniquely allows players of different types of games to co-operate to modify the state of play of the first, high-performance, application.

Embodiments of the present invention may include further features to improve gameplay and simplify interaction between the user of the game and one or more social network users.

In an embodiment of the present invention, the game will proceed with a default modification (e.g. provide a map, release treasure, boost health or select a football team, as applicable) if an acknowledgement message is not received within a predetermined time period. The time period may be fixed, or may be set by the user. Alternatively or in addition, the game may allow the user to override the requirement to receive an acknowledgement message, for example where a network connection is not (or not currently) available.

Similarly, in an embodiment of the present invention, where such a time period has elapsed or the user has elected to proceed without receiving an acknowledgement message, if an acknowledgement message is then received it is ignored by the game. Alternatively, the user may be provided with the option to modify the game upon receipt of the message if this is possible (this may depend upon subsequent progression through the game). In this case the modification (or a modification other than the default modification) is only applied if the acknowledgement message is received within a predetermined period following the transmission of the corresponding alert message.

The above features allow the game to be played when the social network user either has not logged on, or has logged on but failed to run the application, or has run the application but failed to trigger the event associated with the acknowledgement message.

To facilitate interaction with multiple users of a social network, an alert message may nominate multiple users of the social network (or multiple respective alert messages may be sent) and each user of the social network receives a copy of the application. In this case the application may be competitive or cooperative between users of the social network and take advantage of the social network's facilities to provide users with the each other's status with respect to the application. For example, the application may provide a limited time period in which the user with the highest score in the application wins within the group of users in the social network, and, for example, receives a gift (such as a graphic or award) to post on their social network homepage. The social networking client on which the highest score was achieved then sends the acknowledgement message to the user of the game.

Alternatively the application may provide a casual racing game, with prizes for the first M users to complete the race or other such challenge. Achievements gained during the casual game may then be split between the social network users and the player of the high performance game. In this case the entertainment device may therefore only modify game operation in response to the first M acknowledgement messages received, or in the case of a winner-takes-all race, only the first acknowledgement message received (i.e. M=1).

In such ways as these the user of the game can involve and introduce friends and also improve the chances of a receiving an acknowledgement message.

Figure 4:
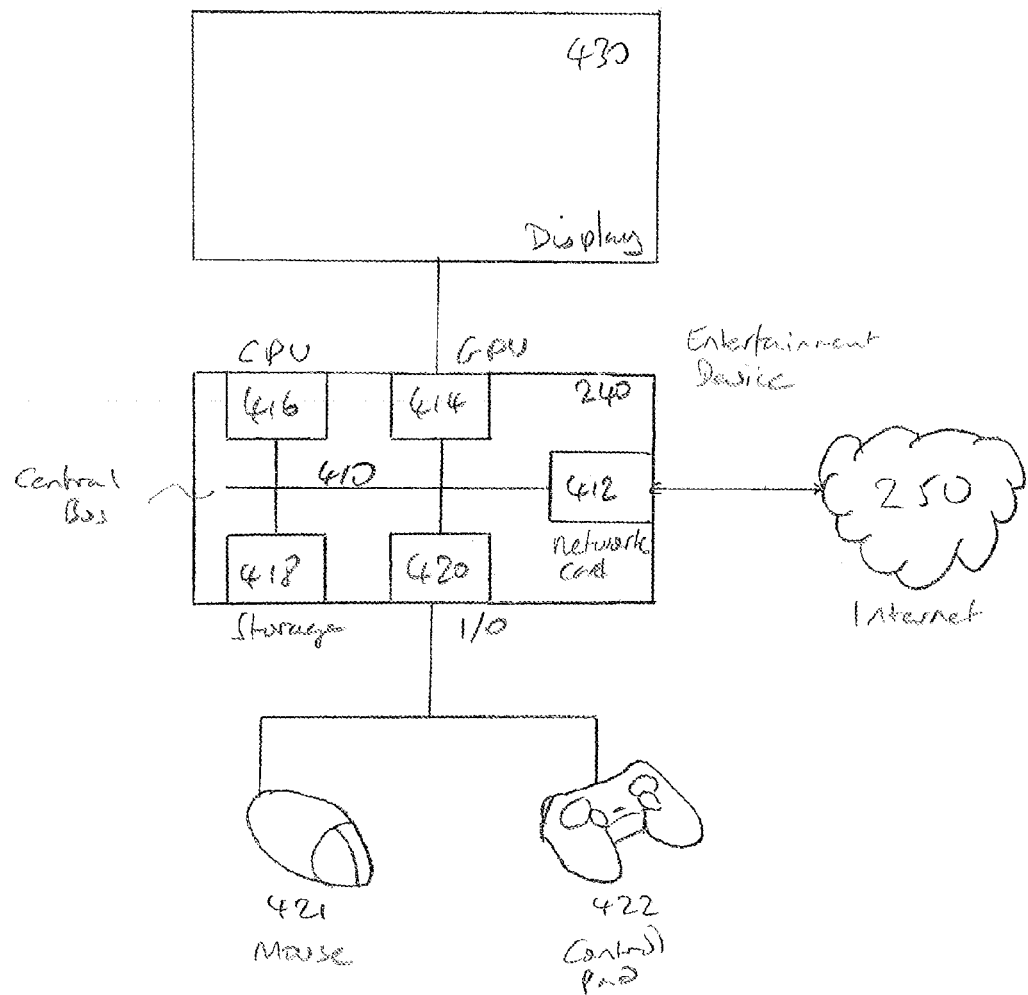
FIG. 4 is a schematic diagram of an entertainment device in accordance with an embodiment of the present invention.

Referring now to FIG. 4, a typical entertainment device 210 (a gaming console or personal computer) comprises a central bus 410, to which are attached a graphics processor 414 and a central processing unit 416, which may have respective or shared memory (not shown), a storage device 418 such as a hard disk drive or flash drive upon which to store the game, and an input/output bridge 420. A display 430 may be connected to an output of the graphics processor, whilst a controller such as a mouse 421 or control pad 422 may be connected to an input of the I/O bridge. In addition the entertainment device comprises a communication arrangement such as a network card 412, with which alert messages may be sent and acknowledgement messages may be received. In an embodiment of the present invention, these messages sent over network links of the internet 250.

It will be appreciated that in principle a single personal computer, for example, could be both the entertainment device when used in one mode of operation (i.e. running the high performance game) and subsequently operate as the social networking client when used in another mode of operation (i.e. when running a web browser that accesses the social network). In this case, the social networking client (i.e. the web browser and any associated data, e.g. cookies and/or a locally cached copy of a downloaded application) is stored on the storage means. Consequently FIG. 4 also represents suitable hardware for running the social networking client. It will nevertheless be appreciated that even on a single PC, the first and second applications operate upon different platforms, with the second application operating with the social networking client whilst the first application does not.

Figure 5:
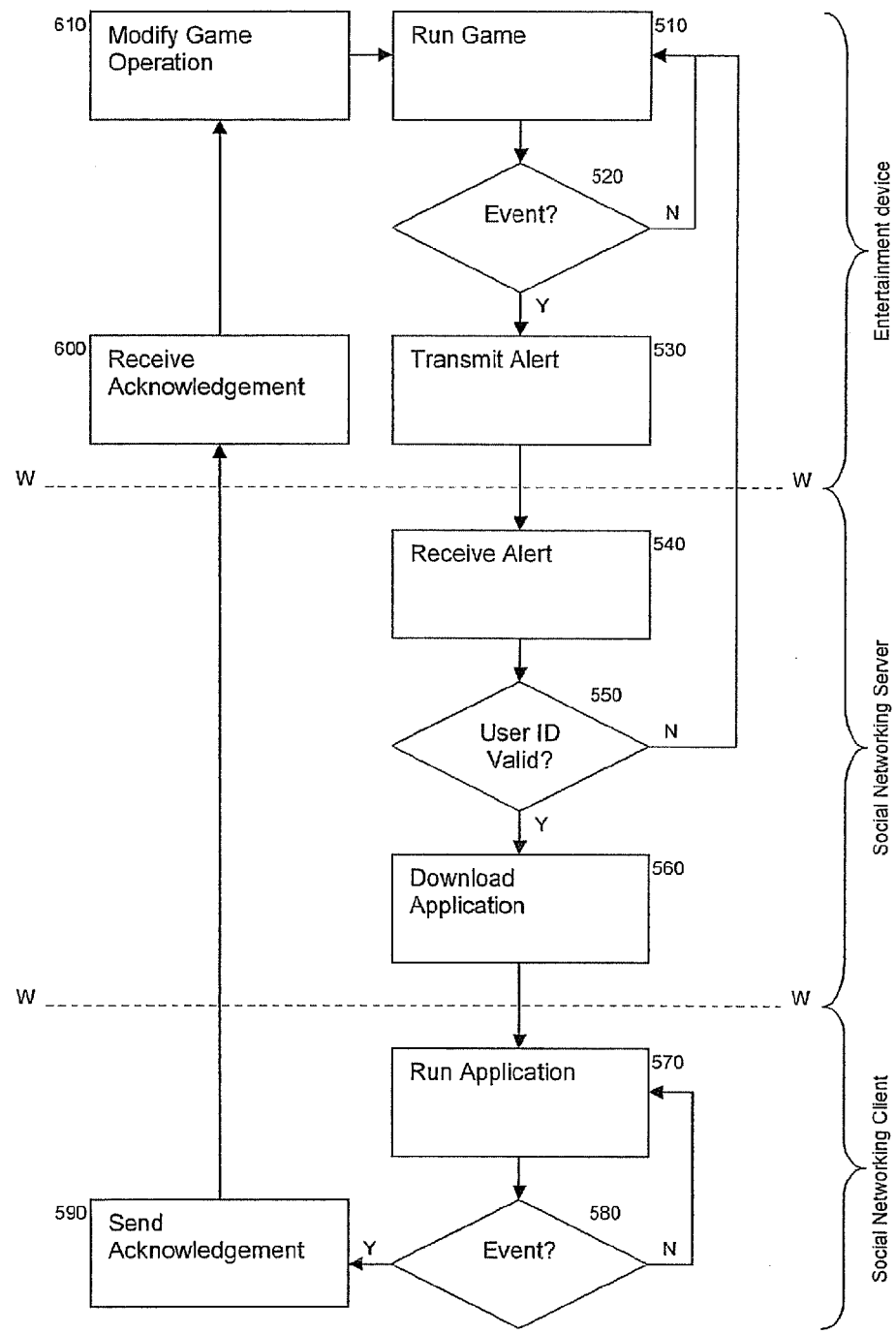
FIG. 5 is a flow diagram of a method of networking in accordance with an embodiment of the present invention.

Referring now to FIG. 5, a networking method in accordance with an embodiment of the present invention comprises various operations of apparatus as described herein and comprises:

In a first step 510 (similar to the operation 302), a game (i.e. the first application) is run on a high specification device 210 such as a games console. In a second step 520 (similar to the operation 304), the game detects whether a first predetermined event has occurred such as described previously herein. If the event has not occurred, then at the step 510 the game continues to run conventionally. However, if the event has occurred then at a step 530 (similar to the operation 306) an alert message is transmitted by the high specification device over a network W such as the internet to either a social networking server or a games server able to route the alert message on to the social networking server.

At a step 540 the social networking server receives the alert message, and at a step 550 (similar to the operation 310) it detects whether a user identified in the alert message is still a current valid user of the social network, and if so arranges to supply a second application for download onto the user's social networking client platform. At a step 560 (similar to the operation 312) the second application is downloaded over the network W, and then the second application is run at a step 570.

At a step 580 (similar to the operation 314), the second application detects whether a second predetermined event has occurred such as described previously herein. If the second predetermined event has not occurred, then at step 570 the second application continues to run conventionally. However, if the second predetermined event has occurred then at step 590 (similar to the operation 316) an acknowledgement message is transmitted by the social networking client over the network W. As described previously, this message may be routed via the social networking server and/or the game server or may be directly routed to the entertainment device as shown in FIG. 5.

At a step 600 (similar to the operation 322) the entertainment device receives the acknowledgment message, and at a step 610 (similar to the operation 324) the entertainment device modifies the operation of the game in response to the acknowledgement message.

It will be apparent to a person skilled in the art that variations in the above method corresponding to operation of the various embodiments of the apparatus as described and claimed herein are also considered within the scope of the present invention.

Finally, it will be appreciated that the methodology disclosed herein may be carried out on conventional hardware suitably adapted as applicable by software instruction or by the inclusion or substitution of dedicated hardware.

For example, various operations may be conducted by suitable adapted high performance game software, game server software, social networking server software, social networking client software and social networking application downloads as applicable.

Thus the required adaptation to existing parts of a conventional equivalent device may be implemented in the form of a computer program product or similar object of manufacture comprising processor implementable instructions stored on a non-transitory data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device.

I claim:

1. A networking system, comprising:
   an entertainment device operable to communicate over a data communication network and operable to run a first application;
   a social networking server operable to communicate over the data communication network and operable to supply a second application to a social networking client over the data communication network, the second application being configured for use on a different platform than the first application; and
   the social networking client being operable to communicate over the data communication network and being operable to run the second application once received from the social networking server, but being inoperable to run the first application; and in which
   in response to a first predetermined event during operation of the first application, the entertainment device is arranged to communicate an alert message to the social networking server over the network, the alert message identifying a user of the social networking client to receive the second application;
   the social networking server is arranged to supply the second application to the social networking client of the identified user in response to the alert message from the entertainment device;
   in response to a second predetermined event during operation of the second application, the social networking client is arranged to communicate an acknowledgement message to the entertainment device; and
   in response to receipt of the acknowledgement message, the entertainment device is arranged to modify the operation of the first application;
   wherein the entertainment device is arranged to modify operation of the first application only if the acknowledgement message is received within a predetermined period following transmission of the corresponding alert message.

2. The networking system according to claim 1, in which the social networking client is an internet browser of a remote device and the data communication network is the internet.

3. The networking system according to claim 1, in which the networking system comprises:
   a game server operable to communicate over the data communication network, and operable to forward the alert message from the entertainment device to the social networking server.

4. The networking system according to claim 1, in which the alert message comprises origin data for identifying the entertainment device.

5. The networking system according to claim 4, in which the social networking server is arranged in operation to associate the origin data with the second application supplied to the social networking client.

6. The networking system according to claim 1, in which the entertainment device is further arranged to modify operation of the first application responsive to the first M acknowledgement messages of a plurality of acknowledgement messages received in respect of the first predetermined event, where M is equal to one or more.

7. The networking system according to claim 1, in which the social networking client is arranged to communicate the acknowledgement message to the entertainment device via one or more selected from the list consisting of:
   i. the social networking server; and
   ii. a game server operable to communicate over the data communication network.

8. The networking system according to claim 1, in which the entertainment device implements a default modification to the operation of the first application if the acknowledgment message is not received within a predetermined period following transmission of the alert message.

9. A method of networking, comprising the steps of:
   operating a first application on an entertainment device;
   detecting a first predetermined event during operation of the first application;
   communicating an alert message over a network in response to the detected first predetermined event of the first application, the alert message identifying a user of a social network;
   receiving the alert message at a social networking server;
   in response to the received alert message, supplying a second application to a social networking client of the identified user, the second application being configured for use on a different platform than the first application, the social networking client being unable to run the first application;
   operating the second application on the social networking client;
   detecting a second predetermined event during operation of the second application;
   communicating an acknowledgement message over the network to the entertainment device in response to the detected second predetermined event of the second application;
   receiving the acknowledgement message at the entertainment device; and
   modifying the operation of the first application responsive to the acknowledgement message, wherein modifying the operation of the first application is dependent upon detecting that the acknowledgement message was received within a predetermined period following transmission of the alert message.

10. The method of networking according to claim 9, in which
    the social networking client is an internet browser connected to the social networking server; and
    the second application is operable to run on the internet browser.

11. The method of networking according to claim 9, in which the step of communicating an acknowledgement message over the network to the entertainment device comprises routing the acknowledgment message over one or more selected from the list consisting of:
    i. the social networking server; and
    ii. a game server.

12. The method of networking according to claim 11, comprising the step of:
    associating origin data with the supplied second application.

13. A tangible non-transitory computer program product on which computer readable instructions of a computer program are stored, the instructions, when executed by a processor, cause the processor to perform a method of networking, the method comprising:
- operating a first application on an entertainment device;
- detecting a first predetermined event during operation of the first application;
- communicating an alert message over a network in response to the detected first predetermined event of the first application, the alert message identifying a user of a social network;
- receiving the alert message at a social networking server;
- in response to the received alert message, supplying a second application to a social networking client of the identified user, the second application being configured for use on a different platform than the first application, the social networking client being unable to run the first application;
- operating the second application on the social networking client;
- detecting a second predetermined event during operation of the second application;
- communicating an acknowledgement message over the network to the entertainment device in response to the detected second predetermined event of the second application;
- receiving the acknowledgement message at the entertainment device; and
- modifying the operation of the first application responsive to the acknowledgement message, wherein modifying the operation of the first application is dependent upon detecting that the acknowledgement message was received within a predetermined period following transmission of the alert message.

* * * * *